United States Patent [19]
Yasui

[11] Patent Number: 5,999,505
[45] Date of Patent: Dec. 7, 1999

[54] INFORMATION PROCESSING DEVICE FOR CONTINUOUSLY AND DISCONTINUOUSLY PROCESSING RECORDED DATA AND RECORDING MEDIUM THEREFOR

[75] Inventor: Yosuke Yasui, Kanagawa, Japan

[73] Assignee: Sony Corporation, Tokyo, Japan

[21] Appl. No.: 08/217,418

[22] Filed: Mar. 24, 1994

[30] Foreign Application Priority Data

Mar. 26, 1993 [JP] Japan .................................. 5-068037

[51] Int. Cl.⁶ ...................................................... G11B 7/00
[52] U.S. Cl. .............................................. 369/48; 369/54
[58] Field of Search .................................... 369/47–49, 54, 369/58, 110, 111, 124

[56] References Cited

U.S. PATENT DOCUMENTS

| | | | |
|---|---|---|---|
| 5,177,720 | 1/1993 | Kondo | 369/48 X |
| 5,200,944 | 4/1993 | Souma | 369/48 |
| 5,243,582 | 9/1993 | Yamauchi et al. | 369/48 X |

*Primary Examiner*—W. R. Young
*Attorney, Agent, or Firm*—Limbach & Limbach

[57] ABSTRACT

In a magnetooptical recording and reproducing device, a segment allocation table containing identification information for identifying whether a file should be time-continuously processed is recorded on a magnetooptical disc. When it is judged on the basis of the identification information of the table that a file to be reproduced from the magnetooptical disc of the magnetooptical recording and reproducing device is a time-continuous file, an MPU controls read-out and write-in operations for a main memory so that data contained in the file to be reproduced is written into a part of the main memory and at the same time data contained in the file to be reproduced is read out from another part of the main memory.

5 Claims, 10 Drawing Sheets

A : Audio Data
V : Image Data
D : Other Data

F I G. 10
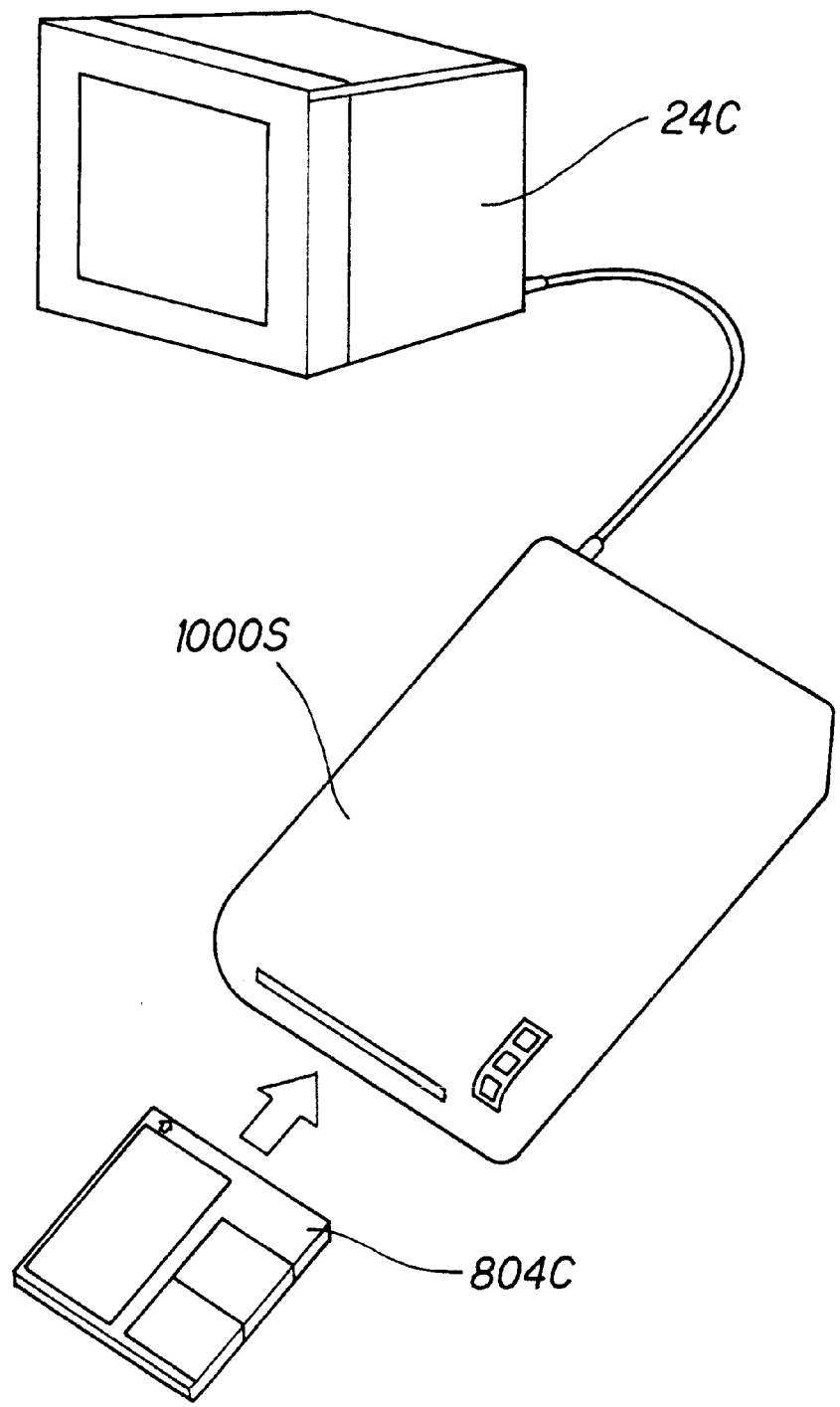

INFORMATION PROCESSING DEVICE FOR CONTINUOUSLY AND DISCONTINUOUSLY PROCESSING RECORDED DATA AND RECORDING MEDIUM THEREFOR

BACKGROUND OF THE INVENTION

1. Field of the Invention

This invention relates to a recording medium on which files for audio data to be processed on a real-time basis or data of motional pictures (video data) and files for still picture data, character data or program data which are not required to be processed on a real-time basis are recorded while mixed with each other, and an information processing device for executing a different processing mode in accordance with a file attribute information recorded on the recording medium.

2. Description of Related Art

It has been well known that a CD-ROM (Compact Disc Read Only Memory) is standardized on the basis of a CD for music (Compact Disc Digital Audio: hereinafter referred to as "CD-DA").

First, a physical format of a CD-ROM will be briefly described.

The physical format is defined as a format with which data can be read out at least physically when a CD-ROM disc is loaded into a CD-ROM driver. A disc may be designed to contain music (digital audio) tracks or data tracks whose maximum number is equal to 99. Information on these tracks is recorded at a head portion which is so-called TOC (Table of Contents), that is, at the innermost peripheral portion of the disc. The portion at which the TOC is recorded is called as "Lead In Track". On the other hand, the last track of the disc, that is, the portion at which the last musical piece is finished is called as "Lead Out Track".

For the CD-DA, stereo signals are digitally recorded at a sampling rate of 44.1 kHz for 16 bits, and thus data of 2(stereo)×2(16 bits)×44,100=176,400 bytes totally are recorded for one second. For the CD-ROM, a sector is treated as a minimum unit for processing. The sector is obtained by dividing one second into 75 equi-segments, and thus one sector comprises 2,352 bytes.

In a CD-ROM MODE-1 as shown in FIG. 1, one sector includes SYNC data (12 bytes) for synchronization, a header (4 bytes), an ECC (Error Correction Coding:276 bytes) for correcting an error, an EDC (Error Detect coding:4 bytes), etc., and thus the residual 2048 bytes of one sector are used to record user data. With respect to audio data, image data, etc. on which a strict error correction using data interpolating processing is not required to be conducted, the ECC and EDC are omitted, and an area of the residual 2,336 bytes excluding the SYNC and the header is used to record the user data in one sector. This format is called as "CD-ROM MODE-2".

CD-I (Compact Disc Interactive) and CD-ROM/XA (CD-ROM extended Architecture) are provided as a superordinate standard. In these CD-I and CD-ROM/XA, the CD-ROM MODE-2 is redefined to add formats of FORM-1 and FORM-2 as shown in FIG. 1. For the CDI, CPU, OS (Operating System), etc. are provided as operating environments for a CD player, that is, environments under which the CD player is allowed to execute applications. The CD-ROM/XA is obtained by removing the provision on these operating environments and directly using and standardizing the physical format for the CD-I or the audio data format.

In the CD-I and CD-ROM/XA as described above, in a case where audio data for which a reproduction processing on real-time basis is required and other data for which the reproduction processing on real-time basis is not required are recorded on a disc while mixed with each other, these data are recorded while interleaved every sector unit in advance. That is, the audio (sound) data A and still picture data V or data D such as other text data are mutually interleaved with each other on sector-unit basis so that neither underflow nor overflow occurs in a process of reproduction processing, and these data are intermittently recorded on a disc in the state where they are interleaved on sector-unit basis as described above.

As described above, the data to be subjected to the reproduction processing on real-time basis (hereinafter referred to as "real-time reproduction processing" and the data for which no real-time reproduction processing is required) are alternately recorded every sector unit, and thus it is required to record identification information for indicating the attribute of the data on each sector.

In order to satisfy this requirement, the following manners have been conventionally made in the FORM-1 and FORM02 of the CD-ROM MODE-2. That is, a submode area (8 bits) is provided in a subheader (8 bytes) of each sector and 1 bit of the submode is allocated as a Real-Time Flag. On the basis of judgment as to whether the Real-Time Flag thus allocated is "0" or "1", it is judged every sector unit whether data should be subjected to the real-time reproduction processing, and a processing mode is switched in accordance with the above judgment result.

As described above, in the FORM-1 and FORM-2 of the CD-ROM MODE-2 which are provided in the conventional CD-I and CD-ROM/XA, the Real-Time Flag (identification information) representing information as to whether data should be subjected to the real-time reproduction processing must be recorded for each sector, so that data management is complicated. In addition, since the processing mode must be switched every sector unit on the basis of the judgment as to whether the data should be subjected to the real-time reproduction processing, so that the processing itself is complicated.

Further, in a conventional CD-ROM file system, when audio or image data are subjected to the real-time reproduction processing, the data are reproduced after all of file data required are stored in a main memory, the data processing is restricted by capacity of the main memory, and a long-time data reproduction cannot be performed.

SUMMARY OF THE INVENTION

An object of the present invention is to provide a recording medium on which both of data to be processed on real-time basis and data not to be processed on real-time basis are recorded while mixed with each other, and which is capable of simplifying management of data attribute, and also to provide an information processing device in which an identification processing for identifying the attribute of data read out from the recording medium, etc. are simplified, and the data can be reproduced through a real-time processing with minimum storage capacity.

In order to attain the above object, the recording medium of this invention is characterized in that a file managing table (a segment allocation table 800 as shown in FIG. 6 for managing a file to be recorded on a data area is provided to a specific area (UTOC as shown in FIG. 6) which is beforehand allocated in a recordable area, and the file managing table is provided with an item in which identification information ("Real-Time" in FIG. 6) for identifying whether a file should be subjected to a time-sequential processing or a time-discontinuous processing.

Further, the information processing device according to this invention is characterized by comprising a recording medium (a magnetooptical disc 804 shown in FIG. 2) on which identification information for identifying whether a file should be subjected to the time-continuous processing or the time-discontinuous processing is recorded, reproducing means (a magnetooptical recording and reproducing device 8 shown in FIG. 3) for reading out data recorded on the recording medium, buffer means (a main memory 4 shown in FIG. 3) having storage capacity corresponding to a plurality of data storage units of the recording medium, and control means (an MPU 2 shown in FIG. 1) for controlling data write-in and read-out operations for the buffer means so that when it is judged on the basis of the identification information read out from the recording medium by the reproducing means that a file read out from the recording medium should be subjected to the time-continuous processing, the write-in operation of data contained in the file to be processed in a part of the buffer means is carried out, and at the same time the read-out operation of data contained in the file to be processed in the other parts of the buffer means, thereby sequentially outputting to the outside the data contained in the file to be processed.

According to the recording medium of this invention, the file managing table for managing a file to be recorded in a data area is provided in the specific area which is beforehand allocated in the recordable area, and the file managing table is provided with the item in which the identification information for identifying whether the file should be processed time-continuously or time-discontinuously is recorded. Therefore, the attribute of the data of the whole file can be identified by merely reading the identification information which is recorded every file.

Further, according to the information processing device, the data write-in and read-out operations for the buffer means are performed so that when it is judged on the basis of the identification information read out from the recording medium by the reproducing means that a file read out from the recording medium should be time-continuously processed, the write-in operation of data contained in the file to be processed in a part of the buffer means is carried out, and at the same time the read-out operation of data contained in the file to be processed in the other parts of the buffer means, thereby sequentially outputting to the outside the data contained in the file to be processed.

BRIEF DESCRIPTION OF THE DRAWINGS

FIG. 10 is a perspective view of an example of an outline structure of another embodiment of the information processing device of this invention.

DETAILED DESCRIPTION OF PREFERRED EMBODIMENTS

Preferred embodiments according to this invention will be described hereunder with reference to the accompanying drawings.

Figure 1:
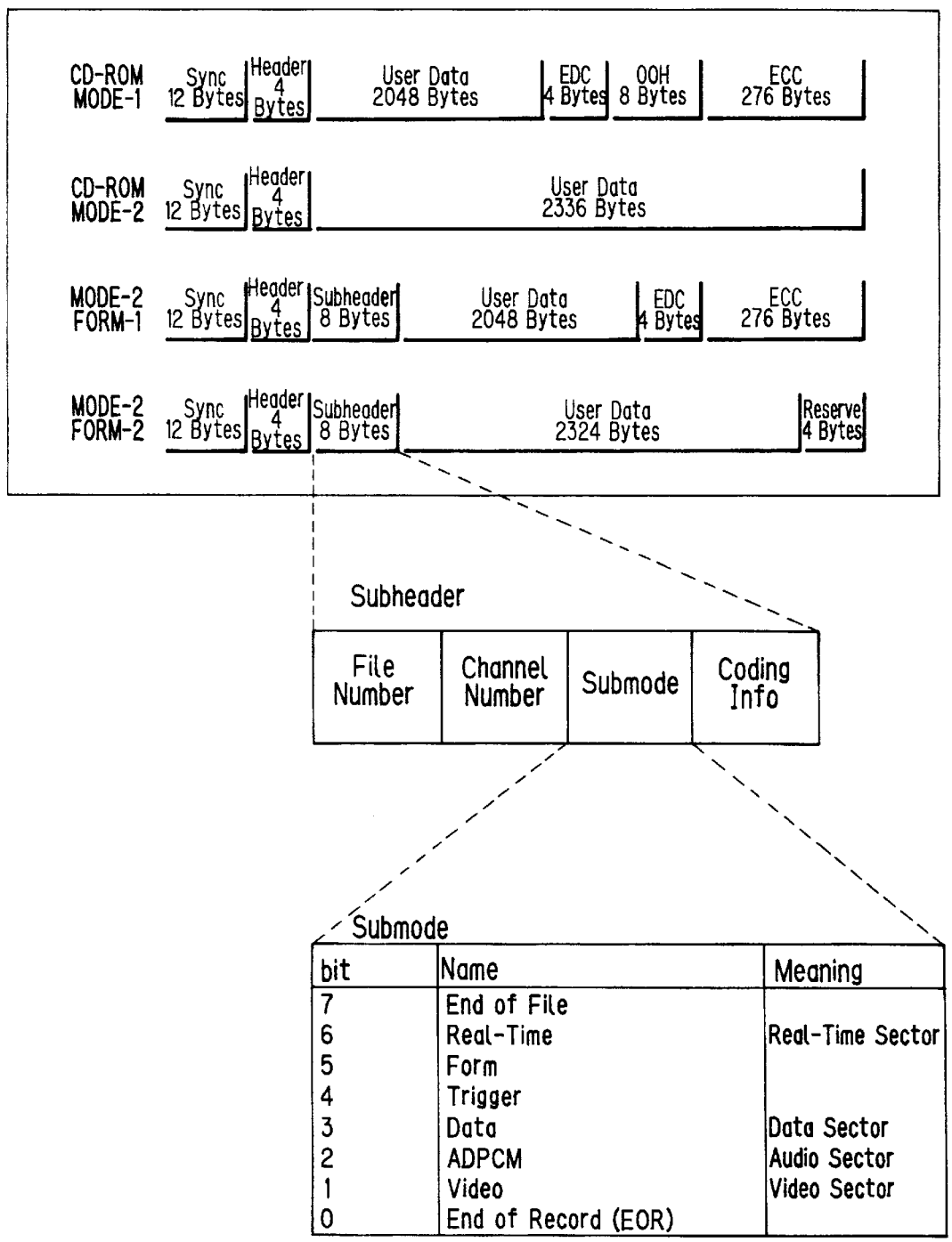
FIG. 1 is a schematic view of a sector structure of a conventional CD-ROM.
Figure 2:
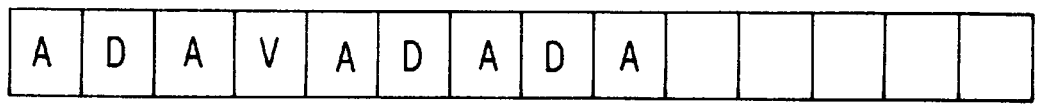
FIG. 2 is a schematic view of an interleave recording state every sector in conventional CD-I and CD-ROM/XA.
Figure 3:
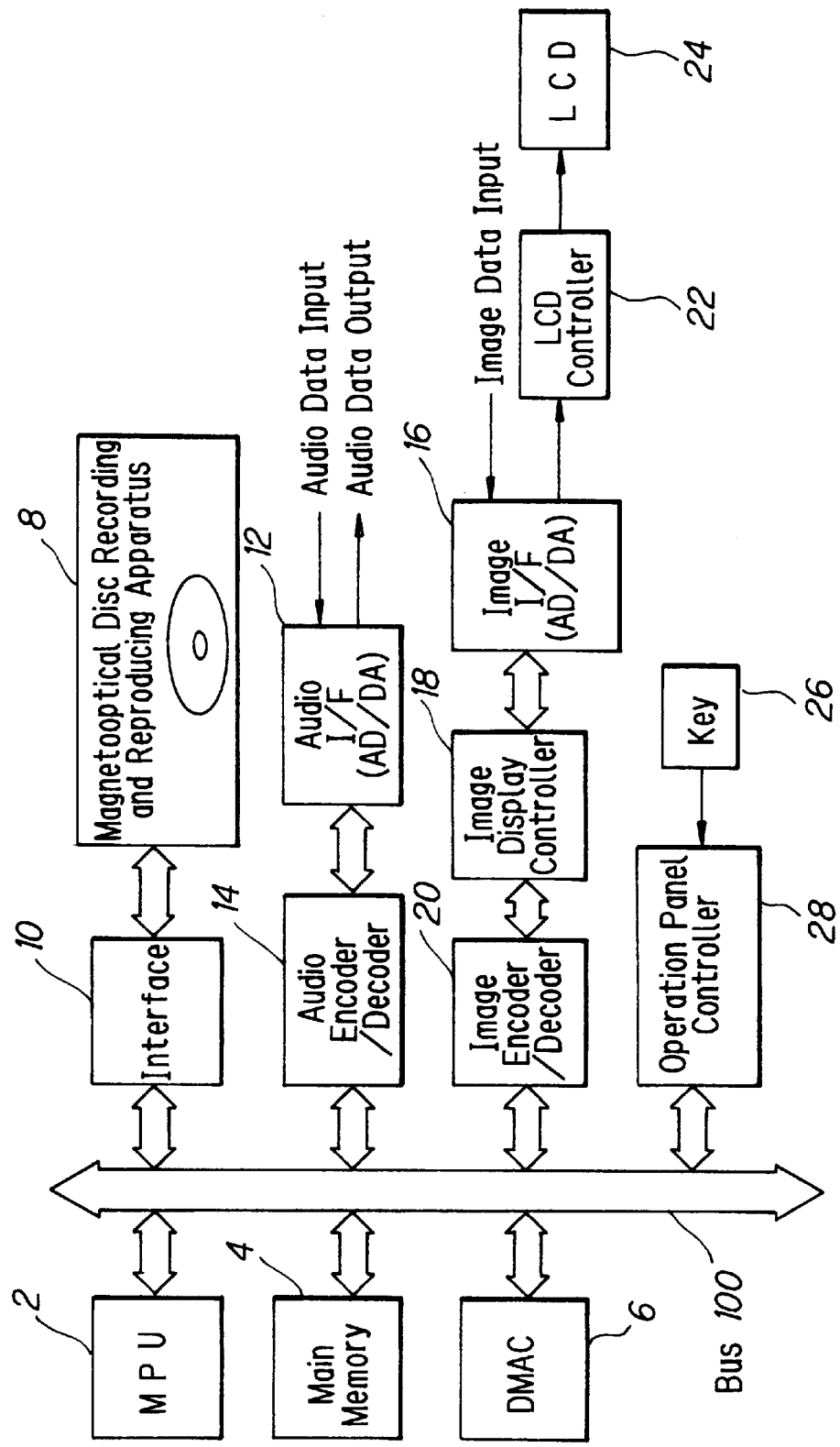
FIG. 3 is a block diagram showing the construction of an embodiment of an information processing device of this invention.

FIG. 3 shows the construction of an embodiment of the information processing device according to this invention.

In the information processing device shown in FIG. 3, an MPU (Micro Processing Unit) 2 includes a ROM for storing a system program and serves to carry out data processing and input/output control. A main memory 4 is a semiconductor memory for storing programs and data which are transmitted by the MPU 2. A DMAC (Direct Memory Access Controller) directly controls data transmission between an input/output device and the main memory without accessing the MPU 2.

A magnetooptical recording and reproducing device 8 serves to record data supplied through a bus 100 and an interface 10 on a magnetooptical disc data when it is set in a recording mode, and also serves to reproduce data from the magnetooptical disc and output it through the interface 10 and the bus 100 when it is set in a reproducing mode.

An audio interface 12 includes an A/D comparator and a D/A comparator. The audio interface 12 serves to digitalize input analog audio data and supply digital audio data to an audio encoder/decoder 14, and also serves to convert digital audio data input from the audio encoder/decoder 14 into analog signals and supply the analog signals to the outside.

The audio encoder/decoder 14 serves to compress digital audio data supplied from the audio interface 10. In this embodiment, the compressing operation as described above is performed by a ATRAC (Adaptive TRansform Acoustic Coding) compression technique. The compressed data is transmitted through the bus 100 to the main memory 4 under control of the DMAC 6. On the contrary, the compressed audio data which are stored in the main memory 4 is transmitted from the main memory 4 through the bus 100 to the audio encoder/decoder 14 under the control of the DMAC 6, and the data thus transmitted are expanded in the audio encoder/decoder 14 and output through the audio interface 12 to the outside.

An image interface 16 includes an A/D comparator and a D/A comparator, and it serves to convert analog image data such as television signals, image pick-up signals output from a camera, etc. to digital image data and supply the thus-converted data to an image display controller 18. Further, the image interface 16 also serves to convert digital image data input from the image display controller 18 to analog image data and supply the thus-converted data to an LCD (Liquid Crystal Display) controller 22. The LCD controller 22 controls an LCD 24 to display an image represented by an input image data.

By the image display controller 18, the digital image data which are input through the image interface 16 are displayed on the LCD 24 through the image data interface 16 and the LCD controller 22, and also supplied to an image encoder/decoder 20.

The image encoder/decoder 20 receives the digital image data from the image display controller 18, and compresses it. The compressed image data are transmitted through the bus 100 to the main memory 4 under the control of the DMAC 6. On the contrary, the compressed image data stored in the main memory 4 are transmitted to the image encoder/decoder 14 under the control of the DMAC 6, and then it is expanded by the image encoder/decoder 14 and supplied to the image display controller 18.

Upon user's manipulation of a key 26, data or a command according to the key manipulation is transmitted through the bus 100 to the MPU 2 under the control of an operation panel controller 28.

Figure 4:
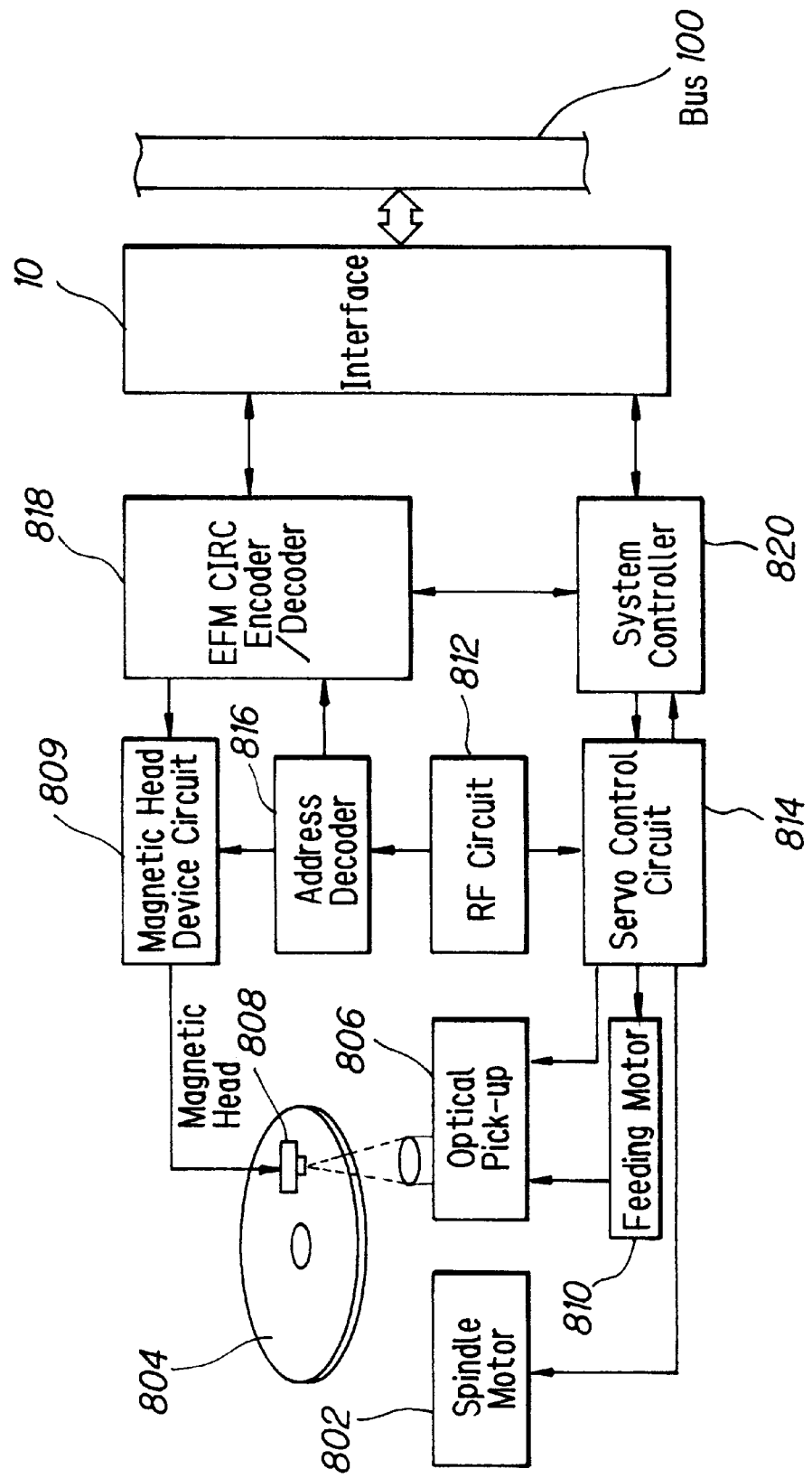
FIG. 4 is a block diagram of an embodiment of a magnetooptical recording and reproducing device shown in FIG. 3.

FIG. 4 is a schematic view showing the construction of a magnetooptical recording and reproducing device 8 applied to the information processing device shown in FIG. 3. This magnetooptical recording and reproducing device is originally designed on the basis of Mini-Disc (trademark) System which has been developed for use in portable, stationary or on-vehicle personal audio equipments. In the Mini-Disc system, a compact and thin recording medium which is called as "mini-disc" is used, and it contains any one of a read-only optical disc of 64 mm diameter, a rewritable MO (magnetooptical) disc and a hybrid disc (also called as "partial ROM disc) provided with mixture of a rewritable area and a read-only area, which is accommodated in a cartridge (W×L×H=72 mm×68 mm×5 mm). For a mini-disc containing a read-only optical disc in the cartridge, data is read out in the same principle as a CD (Compact Disc). On the other hand, for a mini-disc containing an MO disc or hybrid disc in the cartridge, data are recorded by a magnetic-field modulating direct overwrite system. In the magnetic-field modulating direct overwrite system, a high-power laser beam is irradiated to a rotating disc from the lower side thereof to heat a magnetooptical layer at a portion to be recorded to its Curie temperature at which magnetic material of the magnetooptical layer loses its coercive force, and then data are written on the disc by the magnetic head from the upper side thereof.

In such a mini-disc system, integration of respective circuits and optimization of various kinds of parts have been promoted through development for personal audio equipments, so that a device design in compact size and light weight can be achieved, and in addition a battery operation with low power consumption demand can be performed. Such a mini-disc has substantially the same storage capacity (140 Mbytes) as existing 3.5-inch MO discs, so that it is exchangeable for another recording medium. In addition, as compared to the other MO discs, the manufacturing cost of the recording medium can be more reduced, and the cost of a driving device body itself can be reduced. Further, its reliability has been sufficiently proved through its operating experience.

The magnetooptical recording and reproducing device 8 as described above will be described in more detail with reference to FIG. 4.

The magnetooptical recording and reproducing device 8 has the following recording and reproducing operation. That is, magnetic field modulated in accordance with recording data is applied from a magnetic head 808 to a magnetooptical disc 804 which is rotationally driven by a spindle motor 802 while a laser beam is irradiated from an optical pick-up 806 onto the magnetooptical disc 804, thereby performing a data recording operation along a recording track on the magnetooptical disc 804 (so-called "magnetic-field modulating overwrite recording"). On the other hand, the data on the magnetooptical disc are magnetooptically reproduced by tracing the recording track on the magnetooptical disc 804 with the laser beam of the optical pickup 806.

The optical pick-up 806 includes a laser source such as a laser diode or the like, optical parts such as a collimator lens, an objective lens, a polarizing beam splitter, etc., and a photodetector which is segmented in a predetermined arrangement, etc., and it is positioned by a feeding motor 810 so that it faces the magnetic head 808 through the magnetooptical disc 804.

When data are recorded on the magnetooptical disc 804, the magnetic head 808 is driven by the magnetic driving circuit 809, and the optical pick-up 806 irradiates a laser beam onto a target track of the magnetooptical disc 804 to be supplied with a magnetic field modulated in accordance with recording data, thereby performing data recording with a thermal magnetic recording.

Further, when data are reproduced from the magnetooptical disc 804, the optical pick-up 806 detects the laser beam irradiated onto the target track to detect a focus error by a stigmatic method and a tracking error by a push-pull method, and detects difference in polarization angle (Kerr rotational angle) of the laser beam reflected from the target track on the magnetooptical disc to generate reproduction signals.

The output of the optical pick-up 806 is supplied to an RF circuit 812. The RF circuit 812 extracts a focus error signal and a tracking error signal from the output of the optical pick-up 806, and supplies these signals to a servo control circuit 814. At the same time, the RF circuit 812 converts a reproduced signal to a digital signal and supplies it to an address decoder 816. The address decoder 816 decodes an address on the basis of the digital reproduced signal and outputs the address to an EFM•CIRC encoder/decoder 818, and also supplies digital reproduced data other than the digital reproduced data associated with the address to the EFM•CIRC encoder/decoder 818.

The servo control circuit 814 comprises a focus servo control circuit, a tracking servo control circuit, a spindle motor servo control circuit and a sled servo control circuit, etc.

The focus servo control circuit performs a focus control of the optical system of the optical pick-up 806 so that a focus error signal is attenuated to zero. The tracking servo control circuit controls the feeding motor 810 of the optical pick-up 806 so that a tracking error signal is attenuated to zero.

Further, the spindle motor servo control circuit controls the spindle motor 802 so that the magnetooptical disc is rotationally driven at a predetermined rotational velocity (for example, at a constant linear velocity). The sled servo control circuit controls the feeding motor 810 to feed the magnetic head 808 and the optical pick-up 806 to a target track position on the magnetooptical disc 804 which is indicated by the system controller 820.

The EFM•CIRC encoder/decoder 818 conducts a coding processing for error correction, that is, a CIRC (Cross Interleave Reed-Solomon Code) coding processing on those data which are supplied through the bus 100 and the interface 10, and at the same time it conducts a modulation processing suitable for recording, that is, an EFM (Eight to Fourteen Modulation) coding processing on the data.

The coded data which are output from the EFM•CIRC encoder/decoder 818 are supplied as recording data to the magnetic head driving circuit 809. The magnetic head driving circuit 809 drives the magnetic head 804 so that the modulated magnetic field according to the recording data is applied to the magnetooptical disc 804.

When receiving a write-in command through the bus 100 and the interface 10, the system controller 820 controls the recording position on the disc 804 so that the recording data are recorded on the recording track of the magnetooptical disc 84. The recording position control operation as described above is performed as follows. That is, the recording position on the magnetooptical disc 804 of the decoded data which are output from the EFM•CIRC encoder/decoder 818 is managed by the system controller 820, and a control signal indicating a recording position on a recording track on the magnetooptical disc 804 is supplied from the system controller 820 to the servo control circuit 814.

In a reproducing operation, the EFM•CIRC encoder/decoder 818 conducts an EFM demodulation processing and a CIRC demodulation processing for error correction on digital reproduced data input thereto, and outputs the data thus processed through the interface 10 to the bus 100.

When receiving a read-out command through the bus 100 and the interface 10, the system controller 820 controls a reproducing position of the recording track on the magnetooptical disc 804 so that reproduced data are continuously obtained. The control of the reproducing position is performed as follows. That is, the position of the reproduced data on the disc is managed by the system controller 820, and a control signal indicating a reproducing position on a recording track on the magnetooptical disc 804 is supplied to the servo control circuit 814.

Figure 5:
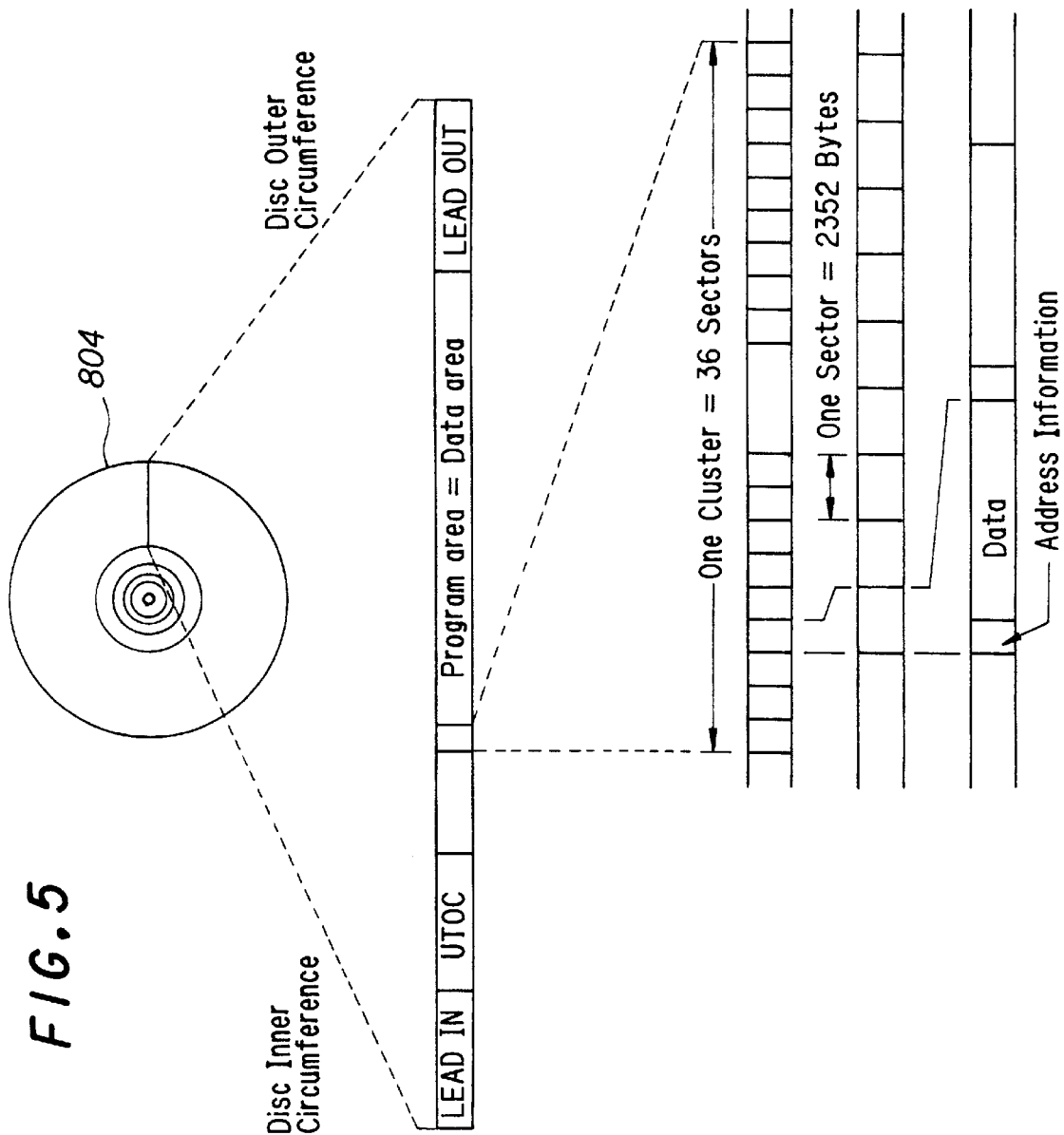
FIG. 5 is a format diagram showing a cluster structure serving as a recording unit of the magnetooptical recording and reproducing device shown in FIG. 4.

Various kinds of data such as image data, audio data, etc. are recorded on the magnetooptical disc 804, and as shown in FIG. 5 the recording track is divided into plural blocks each of which serves as a minimum unit for addresses and is called as "sector". A sector number is allocated as address information to each sector, and the size of each sector is set to 2352 bytes, for example.

The data recording and reproducing operation is carried out for the magnetooptical disc 804 on a cluster basis, the cluster comprising 36 sectors. Therefore, all data are stored in the main memory 4 so as to be classified every block of cluster size and then transmitted to the magnetooptical recording and reproducing device 8. Accordingly, for management of the magnetooptical disc 804 of the magnetooptical recording and reproducing device 8, the MPU 2 performs the management of the data recording and reproducing operation on a cluster basis for any data. For example, for 1-byte data, the data are recorded and reproduced on the disc 804 in 1-cluster size.

Figure 7:
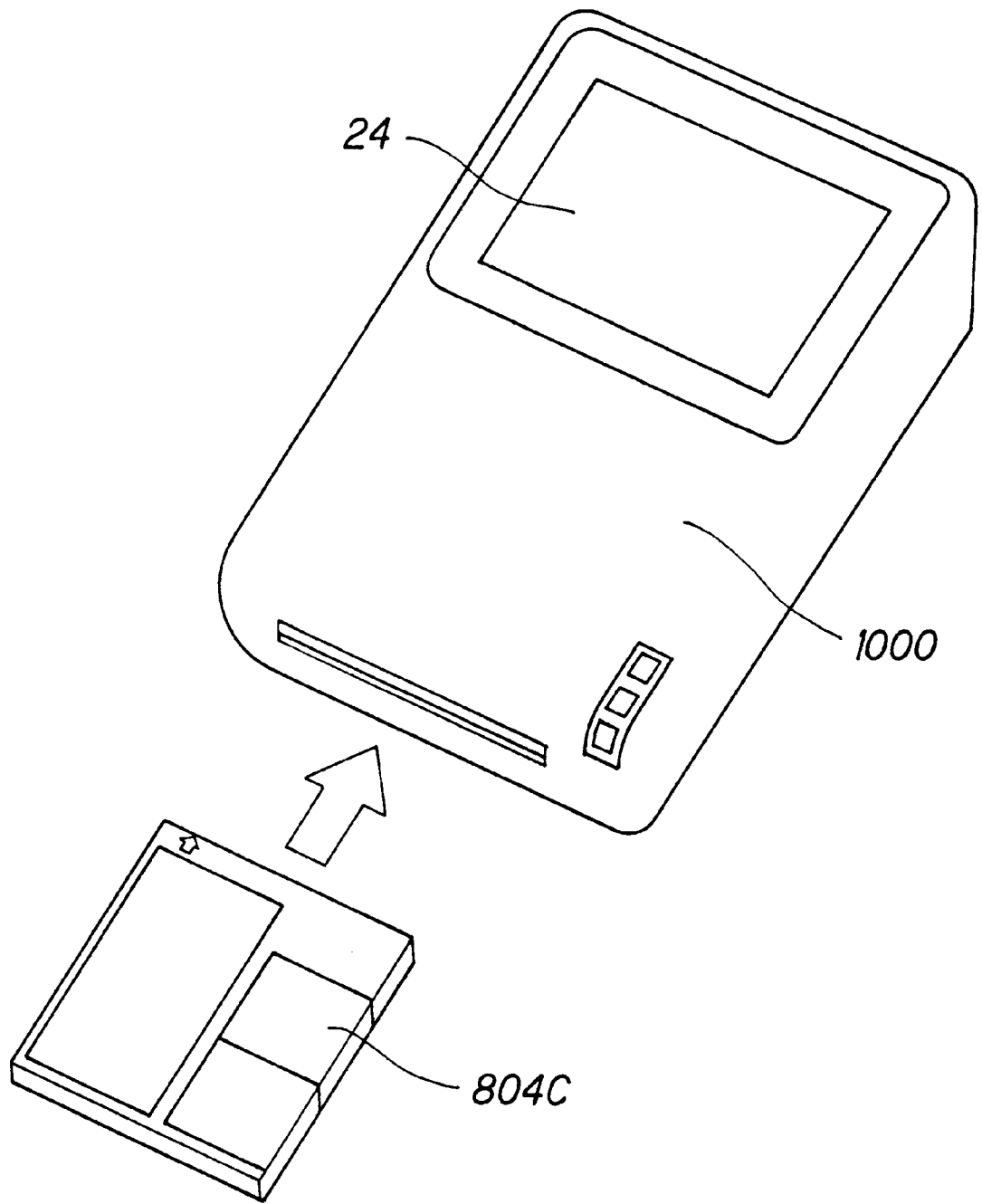
FIG. 7 is a perspective view of an example of an outline structure of the embodiment shown in FIG. 3.

All the elements shown in FIG. 3 are assembled in a case 1000 so as to be fabricated into a portable information processing device as shown in FIG. 7, for example. The magnetooptical disc 804 is accommodated in a cartridge 804C, and loaded into a slot for the recording and reproducing device of the information processing device.

Figure 6:
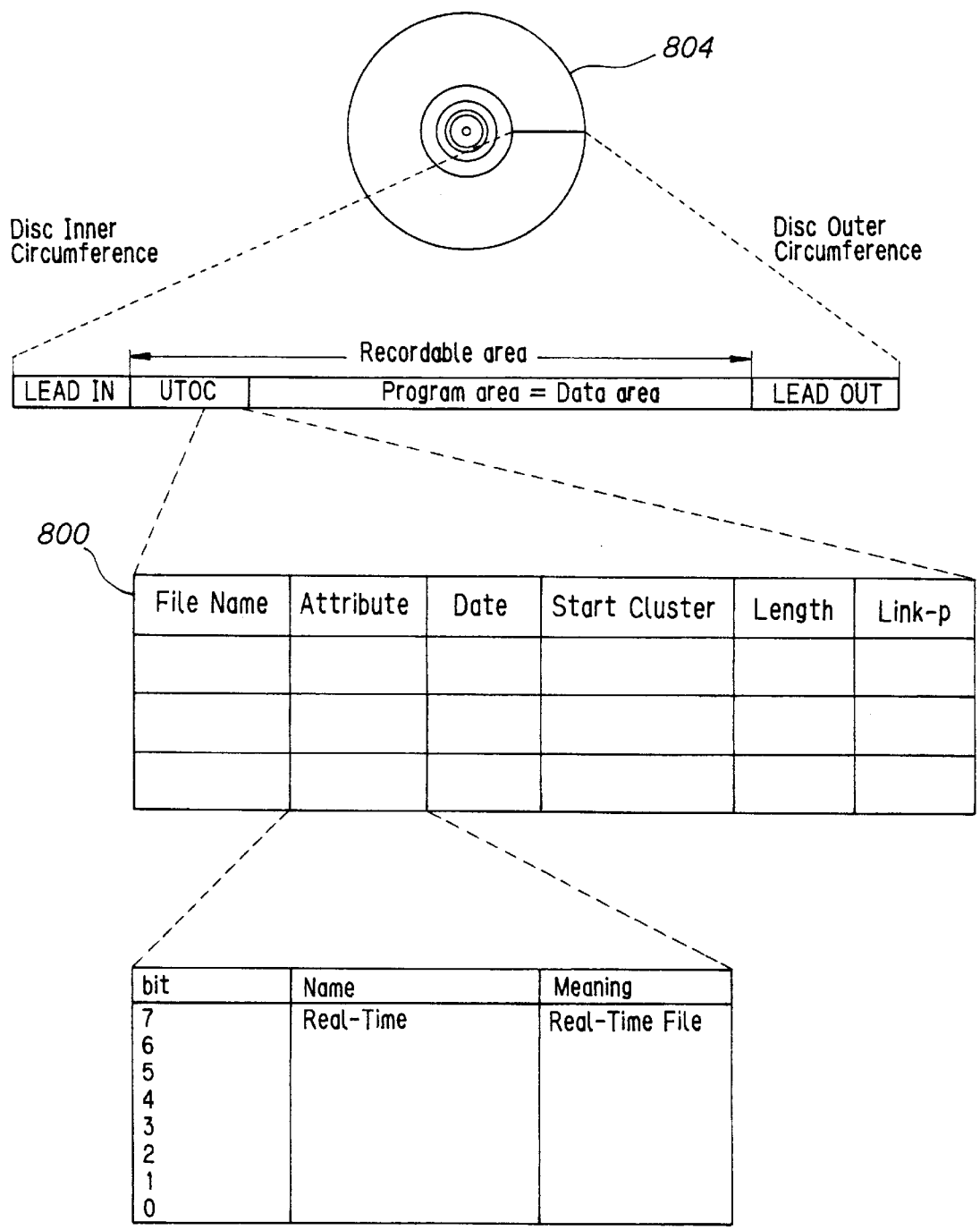
FIG. 6 is a graph showing an embodiment of a segment allocation table used in the embodiment shown in FIG. 3.

As described above, the data input/output to/from the magnetooptical disc 804 is carried out on a cluster basis, and thus in this embodiment a segment allocation table for storing the use status of a cluster group in the data area of the disc 804 is recorded on the disc 804 to perform file management. As shown in FIG. 6, the segment allocation table 800 is recorded in an UTOC (User Table of Contents) area which is subsequent to the lead in area arranged on the innermost periphery of the magnetooptical disc 804. The segment allocation table 800 is provided with entries for respective files, and on each entry are recorded "File Name" representing a file name, "Attribute" representing a file attribute, "Date" representing a date on which a file is recorded, "Start Cluster" representing a head cluster of clusters over which a file is recorded, "Cluster Length" representing the data size of a file, and "Link Pointer" representing the entry of a next cluster when a file is not recorded over sequential clusters.

In the segment allocation table 800 is recorded a Real Time Flag for discriminating a time-continuous file, that is, a file which needs a real-time processing, and a time-discontinuous file, that is, a file which needs no real-time processing. That is, a specific 1-bit of 1-byte attribute information ($2^7$ bits) in the segment allocation table 800 is allocated as the Real Time Flag indicating whether the file is a real-time file. When "1" is set to the Real Time Flag, this indicates that the file concerned is a time-continuous file. On the other hand, when "0" is set to the Real Time Flag, this indicates that the file concerned is a time-discontinuous file.

For a time-continuous file, the file is continuously managed by an interruption handling method or the like so that data thereof are not intercepted. For a time-discontinuous file, the access to the magnetooptical disc 804 is set to be finished after only one read-out/write-in operation. For continuous and large-size data such as audio data, the MPU 2 identifies the audio data, and identification information representing that a file for the audio data is a time-continuous file is written in the segment allocation table to perform the file management. Therefore, as described above, time-continuous files can be briefly reproduced with small buffer capacity, that is, with a small-capacity main memory 4.

Figure 8:
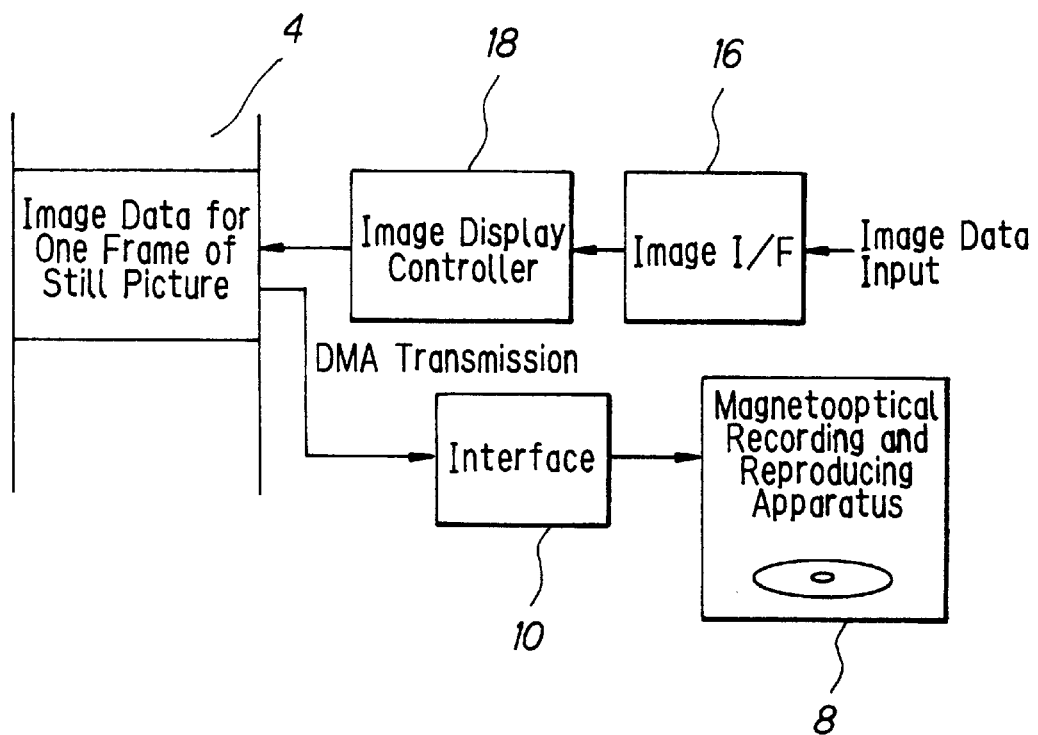
FIG. 8 is a schematic view of an example of a still picture recording operation in the embodiment shown in FIG. 3.

Next, access to the magnetooptical recording and reproducing device 8, that is, the magnetooptical disc 804 in the embodiment shown in FIGS. 3 and 4 will be described. First, image data processing will be described with reference to FIG. 8.

Analog image signals, which are output from a camera for example, are converted to digital image signals by the image interface 16, and then supplied to the image display controller 18. The image display controller 18 returns the input digital image signals to the image interface 16 to convert the digital image signals to the analog image signals, and an image corresponding to the analog image signals is displayed on the LCD 24 through the LCD controller 22.

When a still picture is recorded on the magnetooptical recording and reproducing device 8, the MPU 2 supplies a control signal to the image display controller 18, and in response to the control signal, the image display controller 18 compresses input image signals through the image encoder/decoder 20 and then writes the still picture in the main memory 4 by one frame. Subsequently, the image display controller 18 controls the LCD 24 to display an image represented by the image signals written in the main memory 4 through the image interface 16 and the LCD controller 22.

Subsequently, the MPU 2 supplies a control signal to the magnetooptical recording and reproducing device 8 through the bus 100 and the interface 10, and writes the image data corresponding to one frame of the still picture stored in the main memory 4 into the magnetooptical disc 804 while managing the write-in position on the magnetooptical disc 804 through the system controller 820. Thereafter, the MPU 2 writes identification information indicating a time-discontinuous file into an attribute area of the corresponding entry in the segment allocation table on the magnetooptical disc 804. The data transmission from the main memory 4 to the magnetooptical recording and reproducing device 8 is carried out by the DMAC 6. The control signals from the MPU 2 to the image display controller 18 and the magnetooptical recording and reproducing device 8 are managed by the system program stored in the ROM of the MPU 2.

When a still picture is recorded on the magnetooptical disc 804, the data size thereof is known in advance. Therefore, the MPU 2 performs its control operation so that data are recorded by an amount corresponding to the number of clusters represented by the integer part of a value [data size/cluster size+1], so that the data recording control is performed through only one process. When a still picture is reproduced from the magnetooptical recording and reproducing device 8, the MPU 2 reads out information indicating that the file concerned is a time-discontinuous file from the attribute information of the entry corresponding to the still picture which is to be reproduced in the segment allocation table recorded on the magnetooptical recording disc 804, and performs the time-discontinuous processing in accordance with the read-out information. That is, the MPU 2 reads out, from the segment allocation table recorded in the magnetooptical recording disc 804, a head cluster of the still picture which is required to be reproduced, and instructs the magnetooptical recording and reproducing device 8 to read out image data in the head cluster. At the same time, it instructs the DMAC 6 to transmit the image data of the head cluster. In response to this instruction, the DMAC 6 transmits the image data recorded in the head cluster to the main memory 4. In accordance with the control signal from the MPU 2, the image display controller 18 controls the image encoder/decoder 20 to expand the image data stored in the main memory 4, and also controls the LCD controller 22 to display the expanded image data on the LCD 24.

Subsequently, the MPU 2 refers to an item for the length of the segment allocation table to judge whether the length of the image data is over one cluster. If the length of the image data is judged to be over one cluster, the MPU 2 instructs the magnetooptical recording and reproducing device 8 to read out image data of a next cluster, and at the same time instructs the DMAC 6 to transmit the image data of the next cluster. In response to the instruction, the DMAC 6 transmits the image data recorded in the next cluster to the main memory 4. In accordance with the control signal from the MPU 2, the image display controller 18 instructs the image encoder/decoder 20 to expand the image data stored in the main memory 4, and also controls the LCD controller 22 to display the data on the LCD 24.

The transmission of the still picture data from the disc 804 to the maim memory 4 and the display of the data on the LCD 24 are performed by the amount corresponding to the number of clusters of the still picture. Likewise, the recording and reproducing operation for character data and program data is carried out in the same manner as described above.

Next, the processing for audio data, which is a representative case of a time-continuous file, will be described.

Figure 9:
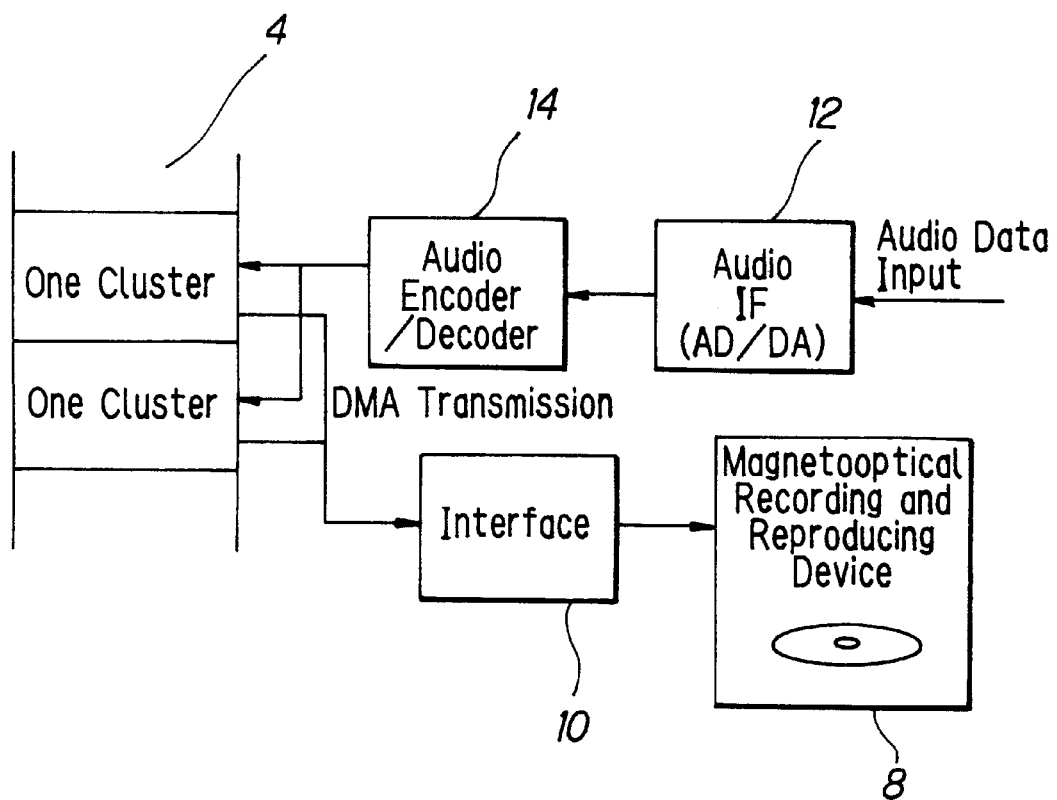
FIG. 9 is a schematic view of an example of an audio data recording operation in the embodiment shown in FIG. 3.

First, a processing for recording audio data on the magnetooptical recording and reproducing device 8, that is, the magnetooptical disc 804 will be described with reference to FIG. 9. Input audio data are converted to digital signals by the audio interface 12, compressed by the audio encoder/decoder 14 and then temporarily stored in the main memory 4. When data in an amount corresponding 1-cluster size (about 64 Kbytes) are stored in the main memory 4, the MPU 2 transmits a control signal to the magnetooptical recording and reproducing device 8 through the bus 100 and the interface 10, and writes audio data of one cluster stored in the main memory onto the magnetooptical disc 804 while controlling the system controller 820 to manage the write-in position on the magnetooptical disc 804. Subsequently, the MPU 2 writes identification information representing that the file concerned is a time-continuous file into the attribute area of the entry corresponding to the segment allocation table of the magnetooptical disc 804. The data transmission from the main memory 4 to the magnetooptical recording and reproducing device 8 is performed by the DMAC 6.

With respect to the audio data, the data size thereof cannot be known in advance and the data are time-continuous data. Therefore, the MPU 2, that is, the system program prepares buffer memory areas for two or more clusters in the main memory 4, and records the data on the magnetooptical disc 804 while switching buffer memory areas to one another every cluster. That is, when the MPU 2 carries out the write-in operation of data into a buffer memory for one cluster in the main memory 4, the MPU 2 simultaneously carries out the read-out operation of data from another buffer memory for one cluster in the main memory 4, whereby the audio data are recorded on the magnetooptical disc 804 without interruption.

When the audio data are reproduced from the magnetooptical recording and reproducing device 8, the MPU 2 is required to carry out the management of the recording data position information, the control of the DMAC and the control of the buffer memories prior to the other jobs so that sound is not interrupted. In order to satisfy this requirement, the MPU 2 is interrupted every time the transmission of audio data of one cluster from the magnetooptical recording and reproducing device 8 to the main memory 4 is completed.

The reproduction of the audio data will be described in more detail. The MPU 2 reads out information (Real Time Flag) representing the time-continuous file from the attribute information of the entry corresponding to audio data to be reproduced in the segment allocation table which is stored on the magnetooptical disc 804, and in response to this information the MPU 2 carries out the time-continuous processing. That is, the MPU 2 reads out the head cluster of the reproduction-required audio data from the segment allocation table recorded on the magnetooptical disc 804, and instructs the magnetooptical recording and reproducing device 8 to read out the audio data in the head cluster, and at the same time instructs the DMAC 6 to transmit the audio data of the head cluster. In response to this instruction, the DMAC 6 transmits the audio data recorded in the head cluster to the main memory 4.

When completing the transmission of one-cluster data from the magnetooptical recording and reproducing device 8 to the main memory 4, the DMAC 6 outputs an interruption signal to the MPU 2. In response to the interruption signal, the MPU 2 makes reference to the segment allocation table, and instructs the magnetooptical recording and reproducing device 8 to read out audio data recorded in a next cluster on the magnetooptical disc 804 when the audio data are located over two or more clusters. At the same time, the MPU 2 outputs a control signal for transmitting the audio data of the next cluster to the DMAC 6. In response to the control signal, the DMAC 6 transmits to the main memory 4 the audio data recorded in the next cluster on the magnetooptical disc 804.

As described above, the transmission of the audio data from the disc 804 to the main memory 4 is performed by the amount corresponding to the number of clusters for the audio data.

In the recording and reproducing operation of the audio data, when the data write-in operation into a buffer memory for one cluster in the main memory is carried out, the read-out operation from another buffer memory for one cluster in the main memory is carried out. Therefore, buffer capacity for only two clusters is required, and thus the buffer capacity required for the recording and reproducing operation can be reduced.

Further, the real-time performance of sound is kept by the interruption to the MPU 2 in the recording and reproducing operation of audio data, and thus the MPU 2 may intermittently access an audio file on the magnetooptical disc 804. Therefore, the MPU 2 may carry out the other processing for times other than the time for accessing the audio file, so that the MPU 2 can be effectively utilized.

As described above, the audio data recorded on the magnetooptical disc 804 are compressed, temporarily stored in the main memory in a compressed state and then expanded by the audio encoder/decoder 14. If during the above expanding operation the MPU 2 stores still picture data recorded on the magnetooptical disc 804 into an area different from the area where the compressed audio data in the main memory 4 are recorded, both of the still picture and the sound can be reproduced.

In the above embodiment, all the elements shown in FIG. 3 are accommodated in a case. In place of this arrangement, for example, all elements other than the LCD controller 22 and the LCD 24 may be accommodated in the case 1000S, and connected to a single CRT 24C as shown in FIG. 10. Further, in addition to the audio data file as described above, video (motional picture) data files may be used as a time-continuous file.

According to the recording medium of this invention, a file managing table for managing files recorded in an data area is provided in a specific area which is beforehand allocated in a recordable area, and the file managing table is provided with an item for storing identification information for identifying whether a file should be subjected to a time-continuous processing or time-discontinuous processing, and thus the identification information for identifying whether data should be subjected to a reproducing operation on a real-time basis can be managed on a file basis. Therefore, as compared with the conventional CD-I and CD-ROM/XA in which the data management is carried out on a sector basis, the management of the data attribute can be more simplified. Further, by merely reading out from the recording medium the identification information which is recorded on a file basis, the data attribute of the whole files can be collectively identified, and the subsequent processing mode can be determined. Therefore, the attribute identification processing of the data read out from the recording medium and the subsequent processing can be simplified.

Further, according to the information processing device of the present invention, when it is judged on the basis of the identification information read out from the recording medium by the reproducing means that a file read out from the recording medium should be time-continuously processed, the write-in and read-out operation for the buffer means is controlled so that data contained in a file to be reproduced are written in a part of the buffer means while data contained in the file to be reproduced are read out from another part of the buffer means, whereby the data of the file to be reproduced are continuously output to the outside. Therefore, the data can be reproduced on a real-time basis using only a buffer means having permissible minimum storage capacity.

What is claimed is:

1. An information processing device, comprising:

a recording medium on which data is recorded thereon as files, the recording medium including identification information for identifying whether a file should be time-continuously processed or time-discontinuously processed;

reproducing means for reading out data recorded on said recording medium;

buffer means having storage capacity corresponding to a plurality of data storage units on said recording medium; and control means for controlling data write-in and readout operations for said buffer means so that when it is judged on the basis of the identification information read out from said recording medium by said reproducing means that a selected file read out from said recording medium should be time-continuously processed, data contained in the selected file are written in a first part of said buffer means and at the same time data contained in the selected file are read out from a second part of said buffer means, to thereby continuously output the data contained in the selected file, and when it is judged on the basis of the identification information read out from said recording medium by said reproducing means that the selected file read out from said recording medium should be time-discontinuously processed, data contained in the selected file are written into said buffer means and thereafter read out from said buffer means, to thereby discontinuously output the data contained in the selected file.

2. The information processing device as claimed in claim 1, wherein the data contained in the file to be time-continuously processed are recorded as compressed data on said recording medium, said information processing device further comprising:

expanding means for expanding the compressed data which is read out from said recording medium by said reproducing means and then stored into said buffer means, and wherein said control means stores data contained in a file to be time-discontinuously processed and recorded on said recording medium in an area different from an area of said buffer means in which the compressed data is stored.

3. The information processing device as claimed in claim 1 or 2, wherein recorded on said recording medium is a file managing table for managing files recorded in a data area, said managing table being provided in a specific area which is allocated within a recordable area, said file managing table including identification information for identifying whether a file should be time-continuously processed or time-discontinuously processed, and wherein on the basis of the identification information read out from said file managing table by said reproducing means, said control means judges whether the file read out from said recording medium should be time-continuously processed or time-discontinuously processed.

4. The information processing device as claimed in claim 3, wherein said recording medium is disc shaped, and said specific area is allocated in a specific sector within a user table of contents area adjacent to a lead in area which is provided on an innermost periphery of said disc, and wherein on the basis of the identification information read out from said file managing table of said recording medium, said control means judges at the read-out start time of said reproducing means whether the file read out from said recording medium should be time-continuously processed or time-discontinuously processed.

5. The information processing device as claimed in claim 3, wherein said recording medium comprises:

a magneto-optical recording medium, wherein data contained in files to be time-continuously processed and data contained in files to be time-discontinuously processed are recorded in said data area by a magnetic-field modulation direct overwrite system, and wherein said reproducing means optically reads out data from said magneto-optical recording medium.

* * * * *